US007496087B2

United States Patent
Garnero et al.

(10) Patent No.: US 7,496,087 B2
(45) Date of Patent: Feb. 24, 2009

(54) METHODS AND APPARATUS FOR CONTROLLING SIGNALLING GATEWAYS

(75) Inventors: Pierre Garnero, Grasse (FR); Didier Desiderio, Le Cannet (FR); Didier Drigues-Hanoun, Juan-les-Pins (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 160 days.

(21) Appl. No.: 10/573,407

(22) PCT Filed: Jul. 23, 2004

(86) PCT No.: PCT/EP2004/051592

§ 371 (c)(1),
(2), (4) Date: Oct. 11, 2006

(87) PCT Pub. No.: WO2005/032163

PCT Pub. Date: Apr. 7, 2005

(65) Prior Publication Data

US 2007/0297389 A1     Dec. 27, 2007

(30) Foreign Application Priority Data

Sep. 26, 2003    (EP)   ................................. 03292367

(51) Int. Cl.
*H04L 12/66*     (2006.01)
(52) U.S. Cl. ........................ 370/352; 370/522; 370/524; 379/229; 379/230
(58) Field of Classification Search ................. 370/352, 370/522, 524; 379/229, 230
See application file for complete search history.

(56) References Cited

FOREIGN PATENT DOCUMENTS

| EP | 1 261 217 | 11/2002 |
|---|---|---|
| EP | 1 271 969 | 1/2003 |

*Primary Examiner*—Quynh H Nguyen

(57) ABSTRACT

A method is described for operating a signalling gateway comprising determining information enabling an application server to identify a signalling gateway process to which to direct a message destined for a particular point code and making said information available to the application server. In preferred embodiments, the information takes the form of a routing table that serves to distribute signalling gateway process identifiers over possible SLS values by, for instance, mapping process instance identifiers to possible SLS values for messages sent by the application server. By allowing the application server processes the possibility to determine to which signalling gateway process each message should be directed, retransmission of messages within the signalling gateway can be avoided.

14 Claims, 5 Drawing Sheets

METHODS AND APPARATUS FOR CONTROLLING SIGNALLING GATEWAYS

CROSS-REFERENCE TO RELATED PATENT APPLICATIONS

European Priority Application No. 03292367.4, filed Sep. 26, 2003, including the specification, drawings, claims and abstract, are incorporated herein by reference in their entirety.

BACKGROUND OF THE INVENTION

1. Field of the Invention

The invention relates to methods, and related apparatus, for controlling processing entities used, for instance, in communication systems such as for the control of signalling traffic between a signalling gateway and a plurality of application server processes.

2. Background Art

Establishing connections between two telephones involves a complex interaction of digital messages, hereinafter referred to generally as signalling. Nowadays telephone systems perform what is known as "out-of-band" signalling. Out-of-band signalling means that the communications required between the switches and other equipment in the network take place on communication channels other than the channel by which the voice or data flows. Typically, the out-of-band signalling takes place by means of digital communication channels. Thus, the public switch telephone network (PSTN) generally uses two types of channels, media and signalling.

Several protocols have been defined for out-of-band signalling. The most commonly used protocol, in North America, Asia and Europe, is known as Signalling System No. 7 (SS7). However, the SS7 protocol defines more: than just a protocol for communication between switches. It also defines an entire switching network for facilitating signalling for call establishment, routing, and information exchange functions of switched circuit networks.

Since the amount of data transferred over data networks is now much larger than the voice traffic that is carried over the PSTN, carriers are in the process of consolidating both types of networks. In addition, telecommunication networks are increasingly making use of standard computing hardware in order to reduce IT costs.

Therefore, there is a trend in the telephone industry to migrate telephone systems using SS7-based networks for signalling to Internet Protocol (IP) networks. The Internet protocols are standardised by the Internet Engineering Task Force (IETF). Moving either or both of the media and signalling channels to an IP infrastructure involves the use of very different technologies and can be done independently. The SIGTRAN IETF working group is currently in the process of defining the protocols for back-hauling SS7 signalling messages across IP networks. Generally speaking, signalling across an IP network involves replacing the lower levels of the SS7 layered protocol communications and transport layers with IP network protocol communications and transport layers.

The SIGTRAN group have taken the initiative to define open standards for transporting SS7 over IP networks. With SIGTRAN technology, telephone services which today lie on top of SS7 networks, can run Application Servers (ASs) lying on top of IP networks. The interworking with SS7 networks is performed by SIGTRAN signalling gateways (SGs).

For additional information regarding SS7 network switching over IP networks, reference may be made to the (IETF) working drafts "Signalling Connecting Control Part User Adaptation Layer (SUA)" available from the IETF website at www.ietforg, and IETF RFC 3332 "SS7 MTP3—User Adaptation Layer (M3UA)", available from the IETF website, and which are both incorporated herein by reference as if reproduced in full. It is noted that the SUA document is a work in progress and is therefore subject to, change. However, these documents, which will be referred to herein as the SIGRAN documents, exemplify the changes necessary to a standard SS7 signalling system for its implementation in an IP network context. As well as defining the functions of signalling gateways and signalling gateway processes, the SIGTRAN documents referred to above specify in detail the protocols to be implemented between a signalling gateway and a application server.

For more general background information regarding SIGTRAN protocols, reference may be made to the International Engineering Consortium, in document "SS7 Over IP Signalling Transport and SCTP," which is available from the IEC website www.iec.org, and which is incorporated herein by reference as if reproduced in full.

To enhance the availability of the signalling gateway, it can be distributed over several processes running in one or several computers, each of them being a Signalling Gateway Process (SGP). Every SGP belonging to a particular SG has the same SS7 point code (or the same list of PCs), with each SGP generally being connected to the SS7 network through redundant links that are selected in conventional manner via Signalling Link Selector (SLS) values present in the SS7 messages.

On the IP network side, each SGP is connected to the ASPs running the services. Each AS, which can typically be identified with a single logical service, such as a Short Message Service Centre (SMSC), can also be implemented in a distributed manner by one or more processes or computers—referred to as the ASPs. To provide improved reliability, each SGP is typically directly connected to each ASP through an Stream Control Transfer Protocol (SCTP) association such that there is one association between each SGP and each ASP.

However, the use of redundant links to the SS7 network, which is highly desirable to ensure fault tolerance of the gateway, can result in latency and performance inefficiencies within the gateway since signalling messages may need to be transmitted between elements of the gateway itself in order to reach signalling unit hardware which carries an outbound SS7 link selected in accordance with an SLS value of a message.

It is an object of the present invention to overcome this and/or other drawbacks with the prior art.

SUMMARY OF THE INVENTION

In brief, the present invention provides a method for operating a signalling gateway comprising determining information enabling an application server to identify a signalling gateway process to which to direct a message destined for a particular point code and making said information available to the application server.

In preferred embodiments, the information takes the form of a routing table that serves to distribute signalling gateway process identifiers over possible SLS values by, for instance, mapping process instance identifiers to possible signal link selector values for messages sent by the application server.

Thus, an application server can obtain more specific information enabling it to determine directly a signalling gateway process to which to transmit messages destined for a particular point code. With use of a distributed gateway architecture where signalling links are distributed over redundant hardware, the SGPs can be hosted so as to each have direct access to signalling unit hardware for a subset of the signalling links. By allowing the application server processes the possibility to determine to which SGP each message should be directed, retransmission of messages within the signalling gateway can be avoided.

In preferred embodiments, the signalling gateway can be responsive to a change in the status of links upon a route to a particular point code to recalculate the routing table for that point code and transmit the recalculated routing table to an application server in a further message. In this way, it can be provided that the ASPs select SGPs on the basis of the SLS values taking into account the availability or not of the signalling links to which each SGP has direct access.

In an SS7 network, the routing decisions are taken by the signalling network management functions of the MTP3 layer. Whenever a change in the status of a signalling link, route or point code occurs, 3 different signalling network management functions (ie signalling traffic management, link management and route management) are activated. However, only a subset of the routing information gathered by the MTP3 layer is transmitted to the remote AS SIGTRAN layer (M3UA or SUA as the case may be). In the systems envisaged by the SIGTRAN documents, only the status of the remote Point Code ("available", "restricted" from SG point of view, or "not available") is reported to the remote AS. The Signalling Gateway maintains the status (availability, restriction, and/or congestion of route to destination) of the individual routes, derives the overall availability or congestion status of the destination from the status of the individual routes, and informs the ASP of this derived status whenever it changes. In at least preferred embodiments, the routing table is included in this message transmitted from an SGP to an ASP that serves to indicate the accessibility of the point code concerned in accordance with the SIGTRAN documents, a separate routing table being established for each destination point code.

Other aspects of the invention provide methods for operating a corresponding application server process, signalling gateway elements and application server elements arranged to carry out the above described methods and a signalling gateway having a redundant set of signalling links to a signalling network and having a single point code, or set of point codes, therein, and comprising a plurality of such signalling elements, with each signalling element comprising a signalling unit to which a subset of the signalling links are connected.

BRIEF DESCRIPTION OF THE DRAWINGS

An embodiment of the invention will now be described, by way of example only, with reference to the accompanying drawings in which.

DETAILED DESCRIPTION OF THE PREFERRED EMBODIMENTS

Figure 1:
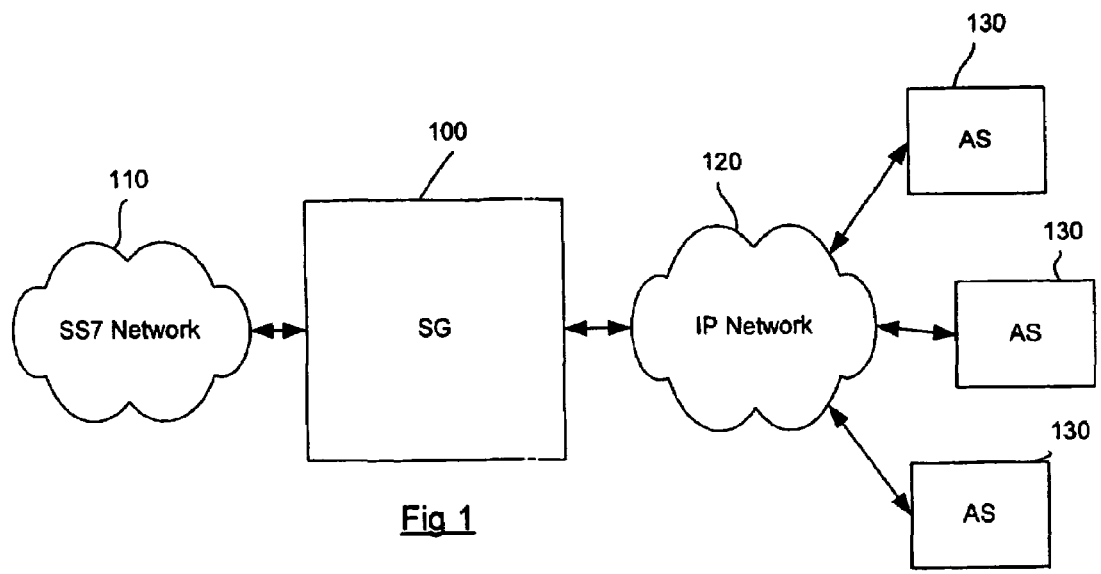
FIG. 1 shows the general configuration of a signalling gateway.
Figure 2A:
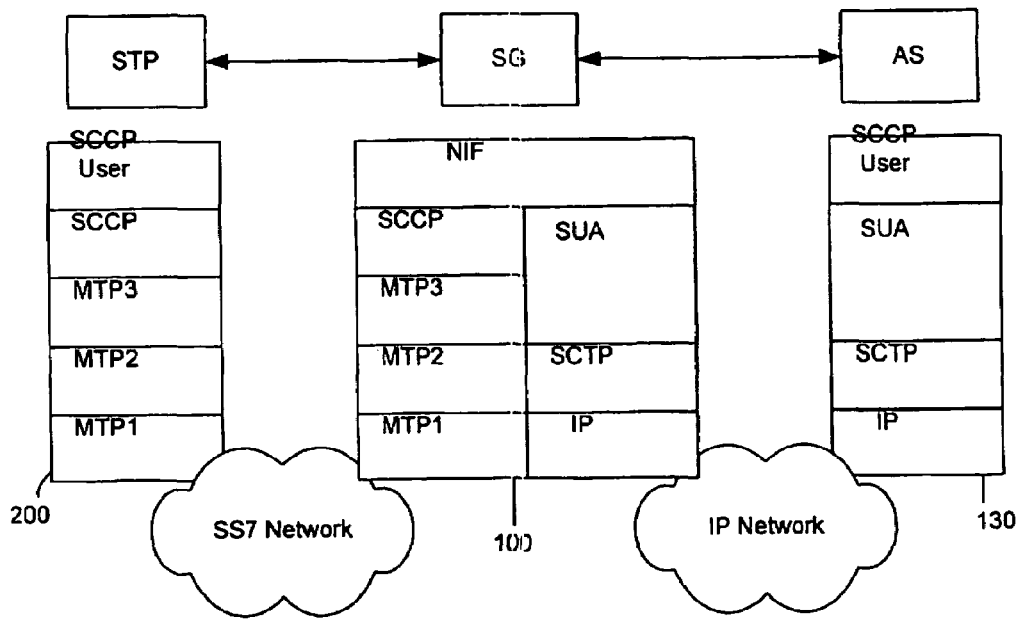
FIGS. 2a and 2b illustrate the layered protocol communications schemes of a Signalling End Point, a Signalling Gateway Process and an Application Server Process.
Figure 2B:
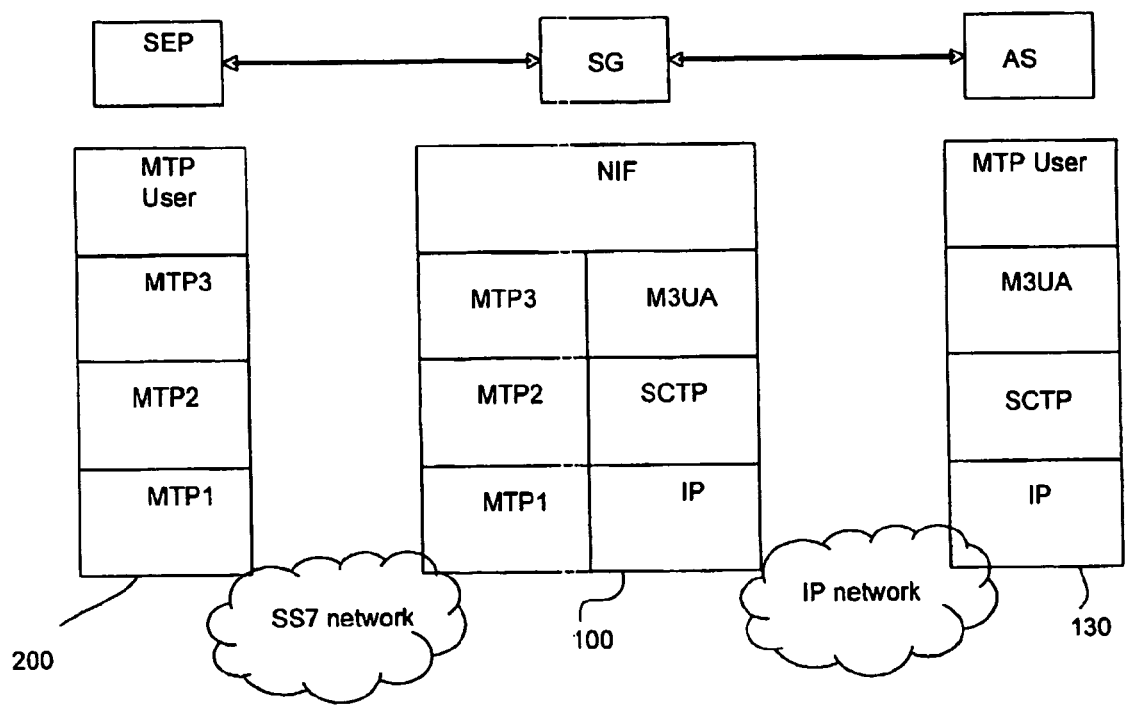

FIG. 1 shows the general configuration of a signalling gateway 100 interconnecting an SS7 network 110 and a series of Application Servers (ASs) 130 via an IP Network 120. FIGS. 2a and 2b illustrate the layered protocol communications architecture of the various components. SS7 Signal Transfer Point (STP) or Signal End Point (SEP) 200 includes the MTP1, MTP2, MTP3, SCCP and SCCP user part layers. As is known in the prior art, a Signal Transfer Point (STP) or Signal End Point (SEP) 200 routes SS7 signalling within the SS7 network and manages various signalling links which comprise the SS7 network. Routing is accomplished by processing of the routing label of an SS7 message by the Message Transfer Part (MTP) functionality. The MTP layers comprise three levels. Levels 1 and 2 are used for the transfer of SS7 messages from one point to another over an individual signalling link. Level 3 is used for the transfer of SS7 messages over the SS7 network beyond the requirements of individual link transmission. The MTP3 layer is mainly dedicated to ensuring the delivery of incoming and outgoing messages (such as discrimination, distribution and routing), and the network reconfiguration (such as traffic management, route management and link management).

Communication between Signalling Gateway Processes (SGPs) of the SG 100 and Application Server Processes (ASPS) within the ASs 130 is carried out using a transport layer defined by the SIGTRAN working group and referred to as SCTP (Stream Control Transfer Protocol) which is defined in RFC 3309. Signalling Gateway 100 terminates the MTP1, MTP2, MTP3 and SCCP layers and includes a Nodal Interworking function (NIF) as well as SUA, SCTP and IP layers. Each AS 130 includes IP, SCTP, SUA and SCCP user layers. Signalling Gateway 100 thus terminates the SS7 lower layers and encapsulates their payload data into SCTP messages to send them to an Application Server 130. The AS terminates the SCTP layers, processes the signalling messages and replies to the SG 100 in the same way. In the case of SS7 and M3UA interworking, the M3UA adaptation layer is designed to provide an extension of the MTP3 layer as shown in FIG. 2b.

These architectures are well known to those skilled in the relevant art and are described in the SIGTRAN documents, referred to above.

Figure 3:
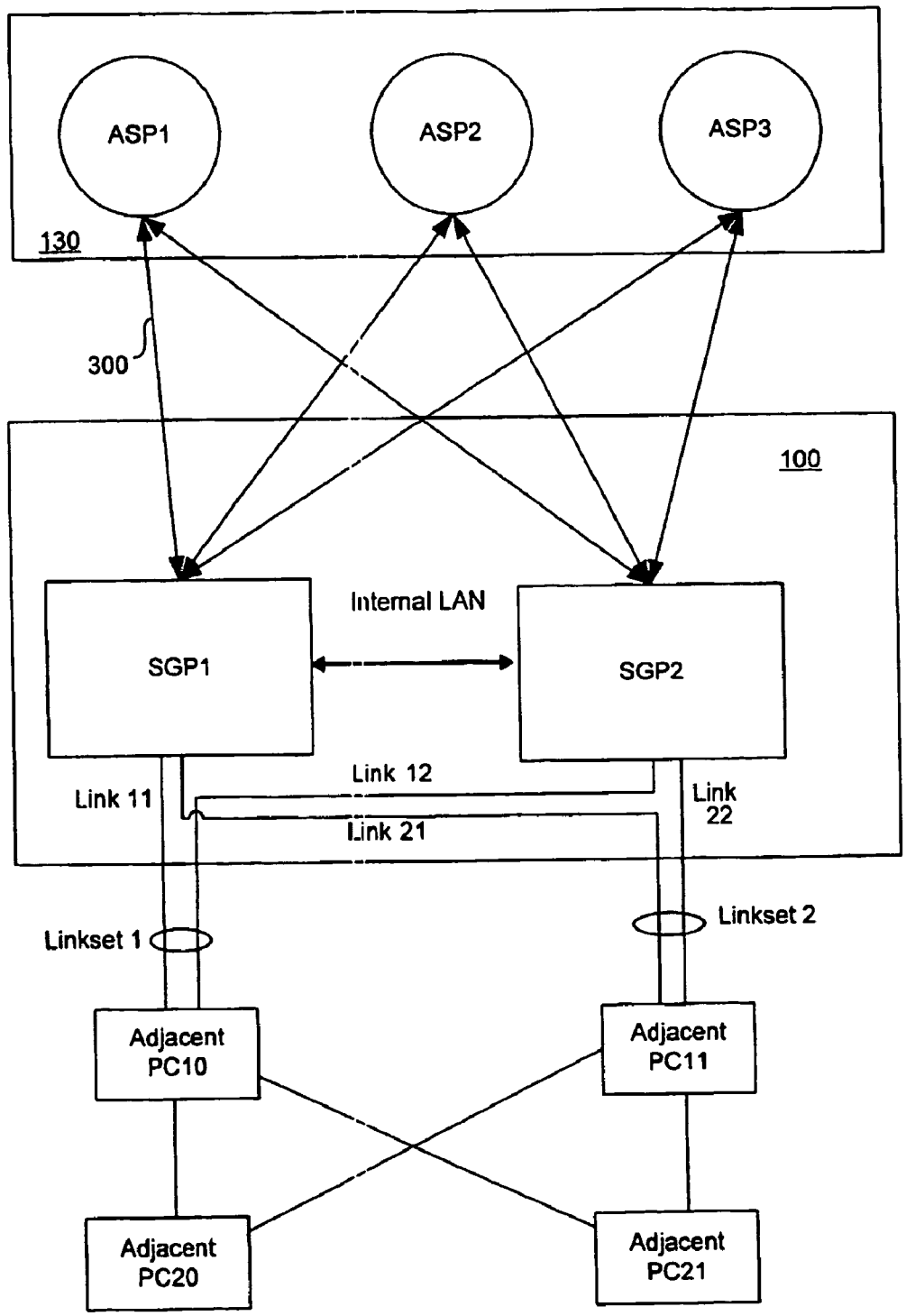
FIG. 3 illustrates associations between Signalling Gateway processes and Application Server processes and signalling connections to point codes.

FIG. 3 illustrates the interconnection of a plurality of SGPs, such as SGP1 and SGP2 to a plurality of ASPs, such as ASP1, ASP2 and ASP3 via a plurality of SCTP associations 300. The architecture is such that each SGP is hosted in a machine that contains the signalling units that provide only a subset of the MTP2 signalling links to SS7 network 110 available on the SG.

On the SS7 network, the routing decisions are taken by the signalling network management functions of the MTP3 layer. Whenever a change in the status of a signalling link, route or points occurs, 3 different signalling network management functions (ie signalling traffic management, link management and route management) are activated. The protocols defined in the SIGTRAN documents provide for a subset of the routing information gathered by the MTP3 layer to be transmitted to the remote AS SIGTRAN layer (M3UA or SUA as the case may be). Basically, only the status of the remote Point Code ("available", "restricted" from SG point of view, or "not available") is reported to the remote AS by means of DUNA (destination unavailable), DRST (destination restricted), DAVA (destination available) SIGTRAN messages respectively.

The DUNA message is sent from an SGP in an SG to all concerned ASPs to indicate that the SG has determined that one or more SS7 destinations are unreachable. It is also sent by an SGP in response to a message from the ASP to an unreachable SS7 destination. As an implementation option the SG may suppress the sending of subsequent "response" DUNA messages regarding a certain unreachable SS7 destination for a certain period to give the remote side time to react. If there is no alternate route via another SG, the MTP3-User at the ASP is expected to stop traffic to the affected destination via the SG as per the defined MTP3-User procedures.

The DUNA message contains the following parameters:
Network Appearance Optional
Routing Context Optional
Affected Point Code Mandatory
INFO String Optional The optional INFO String parameter is defined so as to be able to carry any meaningful UTF-8 character string along with the message. The length of the INFO String parameter is from 0 to 255 octets. No procedures are specifically identified in the SIGTRAN documents for its use but it is suggested that the INFO String may be: used for debugging purposes. The DRST, DAVA and DAUD messages have similar formats.

In the case of a distributed Signalling Gateway in which each SGP is hosted in a machine that contains the signalling units that provide only a subset of the MTP2 signalling links to SS7 network 110 available on the SG, the information available on the AS side, and provided by the SIGTRAN (M3UA or SUA) layer in accordance with the protocols described in the SIGTRAN documents is therefore not sufficient to allow an ASP to identify the SGP that contains the SS7 signalling link that corresponds to a particular SLS value for a given destination point code. Thus if the ASP sends a message to an SGP that does not contain the right signalling link, the selected SGP must in a separate step forward the message within the SG to the SGP that does contain the signalling link.

A protocol will be described below which is based on messages embedded in the SIGTRAN messages by means of the usage of "info string" field. By taking advantage of this extra information, the ASPs are able to determine the SGP that contains the signalling link, on which the message must be forwarded, directly.

The protocol, which will be referred to as RSIG in this document, is implemented by 4 messages:
ROUTING_INFO_CAPABILITY_REQ This message is sent from the ASP to the SGP embedded in an ASP_ACTIVE SIGTRAN message to determine whether the remote SGP supports the RSIG protocol, to gather the RSIG identifier of the remote SGP and to indicate that this ASP may request RSIG information from the SGP. The ASP sends this message to Bach SGP in the SG in order to collect all the RSIG IDs.
ROUTING_INFO_CAPABILITY_ACK This message is sent from the SGP to the ASP, in an ASP-ACTIVE-ACK SIGTRAN message in response to a received ROUTING_INFO_REQ message, to indicate that the SGP supports the RSIG protocol and that the SGP authorizes the ASP to gather RSIG information and to report the SGP's RSIG identifier.
ROUTING_TABLE This message is sent by an SGP to the ASP, in a DAVA SIGTRAN message to indicate the routing (for each SLS) for a particular destination.
ROUTING_INFO_REQ This message is sent by an ASP to the SGF, in a DAUD SIGTRAN message to indicate that as part of the audit of the specified destination, the routing table is requested. The DAUD message is defined in the SIGTRAN protocols to be sent from the ASP to the SGP to audit the availability or congestion state of SS7 routes from the SG to one or more affected destinations. The format and description of DAUD Message parameters is the same as for the DUNA message described above. This message has an immediate effect in the sense that the routing table corresponding to the audited PC is made immediately available by the SGP (by means of a DAVA containing a RSIG ROUTING_TABLE message) but it also indicates, in the SGP, that each time an event occurs that affects the routing of the PC concerned, the SG must inform the ASP. By this means, the information sent: by the SGPs to the ASPs is limited to the set of remote PC's that each ASP needs to handle.

As "info string" field must be contain only ASCII characters, the messages of the RSIG protocol are based on ASCII only and are described by the following ABNF grammar (see RFC2234) description:

```
RSIGMessage = RSIGToken SLASH Version SEP messageBody
messageBody = 1*1( RoutingInfoCapabilityReq   /
                   RoutingInfoCapabilityAck   /
                   RoutingTable               /
                   RoutingInfoReq )
RoutingInfoCapabilityReq  =  RoutingInfoCapabilityReqToken  EQUAL  LBRKT
RBRKT
RoutingInfoCapabilityAck  =  RoutingInfoCapabilityAckToken  EQUAL  LBRKT
RICAParameters RBRKT
RoutingTable = RoutingTableToken EQUAL LBRKT SLSTable RBRKT
RoutingInfoReq = RoutingInfoReqToken  EQUAL  LBRKT  RIRParameters  RBRKT
RICAParameters  = RICASGPId COMMA RICAResult
RICASGPId       = RICASGPIdToken EQUAL 1*3(DIGIT)
RICAResult      = ResultToken EQUAL RICAResultValue
RIRParameters   = RIRInfo
RIRInfo         = RIRInfoToken EQUAL RIRInfoEnableToken
```

-continued

```
SLSTable       = (SLSITUTable / SLSANSITable)
SLSITUTable    = SLSITUTableToken EQUAL LBRKT SLSITUTableResult RBRKT
SLSANSITable   = SLSANSITableToken EQUAL LBRKT SLSANSITableResult RBRKT
RICAResultValue = 1*2(DIGIT) ; today 2 values are defined:
                             ; => 1 : OK, the capability is supported
                             ; => 2 : KO, the capability is not supported
SLSITUTableResult  = 16*16(1*3(DIGIT) COMMA) 1*3(DIGIT)
SLSANSITableResult = 32*32(1*3(DIGIT) COMMA) 1*3(DIGIT)
Version = 1*2(DIGIT) ; today, only version 1 is defined
DIGIT              = %x30-39     ; 0-9
SLASH              = %x2F        ; "/"
SP                 = %x20        ; space
HTAB               = %x09        ; horizontal tab
CR                 = %x0D        ; Carriage return
LF                 = %x0A        ; linefeed
EOL                = (CR [LF] / LF )
WSP                = SP / HTAB ; white space
SEP                = ( WSP / EOL )
LWSP               = *( WSP / EOL )
LBRKT              = LWSP %x7B LWSP ; "{"
RBRKT              = LWSP %x7D LWSP ; "}"
COMMA              = LWSP %x2C LWSP ; ","
EQUAL              = LWSP %x3D LWSP ; "="
RSIGToken                       = ("RSIG")
RICASGPIdToken                  = ("RICASGPID" / "RICASI")
RIRInfoToken                    = ("RIRI")
RIRInfoEnableToken              = ("OFF" / "ON")
RoutingInfoCapabilityReqToken   = ("RICR")
RoutingInfoCapabilityAckToken   = ("RICA")
RoutingTableToken               = ("RT")
RoutingInfoReqToken             = ("RIR")
ResultToken                     = ("RES" / "R")
SLSITUTableToken                = ("SLSITUTAB" / "SIT")
SLSANSITableToken               = ("SLSANSITAB" / "SAT")
```

It will be appreciated that a decoder of such a grammar can be readily implemented with commonly available tools.

In the following, an example will be given of behaviour for the system illustrated in FIG. 3 with an ASP and a SG 100 composed of 2 SGPs, SGP1 and SGP2. SGP1 and SGP2 are shown as being hosted on physically separate hardware platforms interconnected by an internal local area network. Each component is assumed to be configured to make use of the RSIG protocol.

The exemplary SS7 topology shown in FIG. 3 is as follows: SGP1 contains 2 signalling links: link 11 and Link 21; SGP2 contains 2 signalling links: link 12 and link 22. SG 100 is connected to PC 10 by linkset 1 and to PC 11 by linkset 2. A linkset is a number of signalling links that directly interconnect two signalling points and which are used as a module—links within the linkset being selected by means of a the SLS values in each message. It will be understood that the separate signalling links within the linksets are generally always distributed over different SGPs for redundancy reasons.

The SG 100 is connected in associated mode to 2 adjacent nodes: PC 10 and PC 11. In this example, two other remote point codes, are also available on the network: PC 20 and PC 21. Each of them is reachable via 2 routes. The network is assumed for the purposes of example to be an ITU network.

Figure 4:
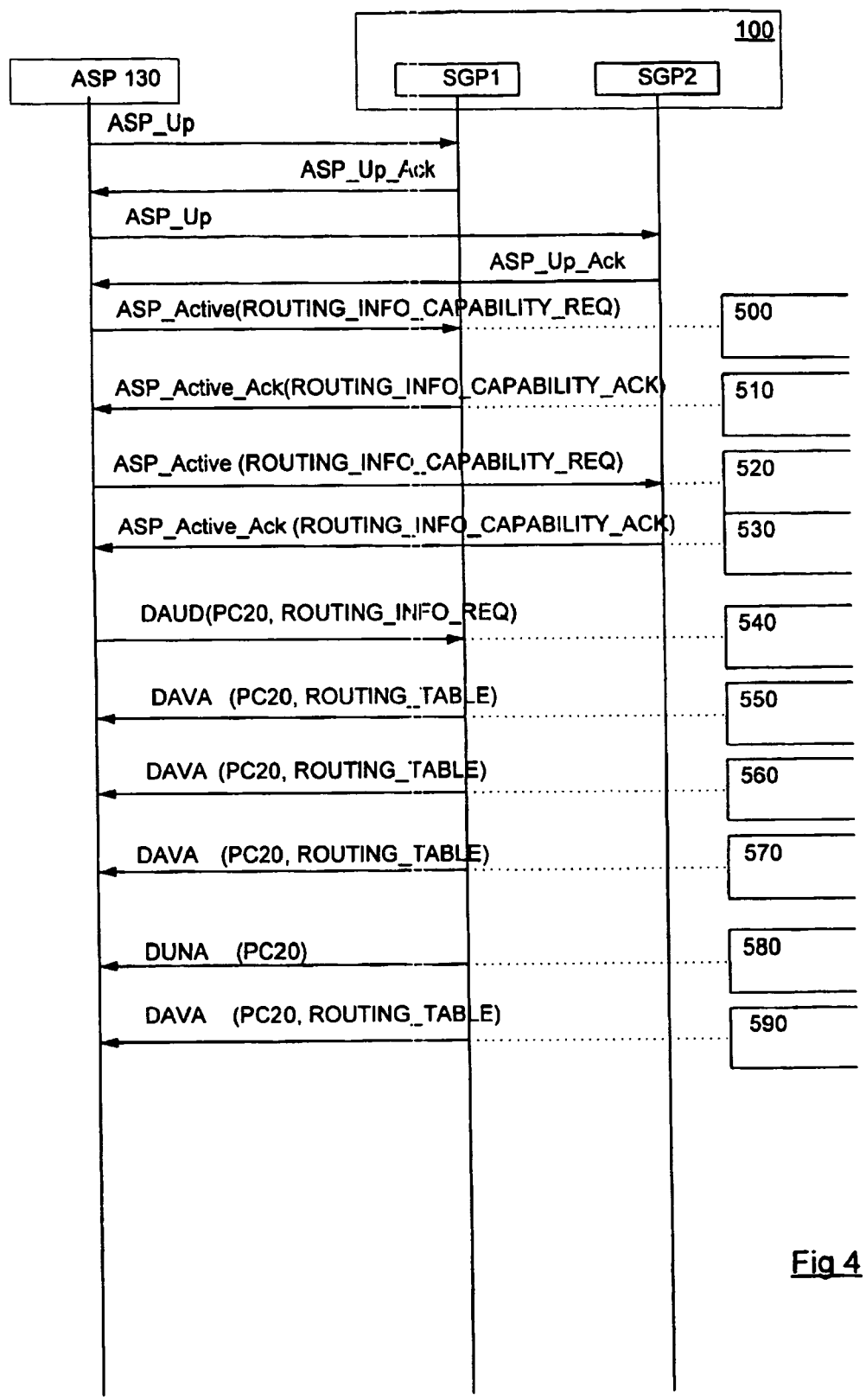
FIG. 4 shows an exemplary sequence of events and signalling network management message exchanges.
Figure 5:
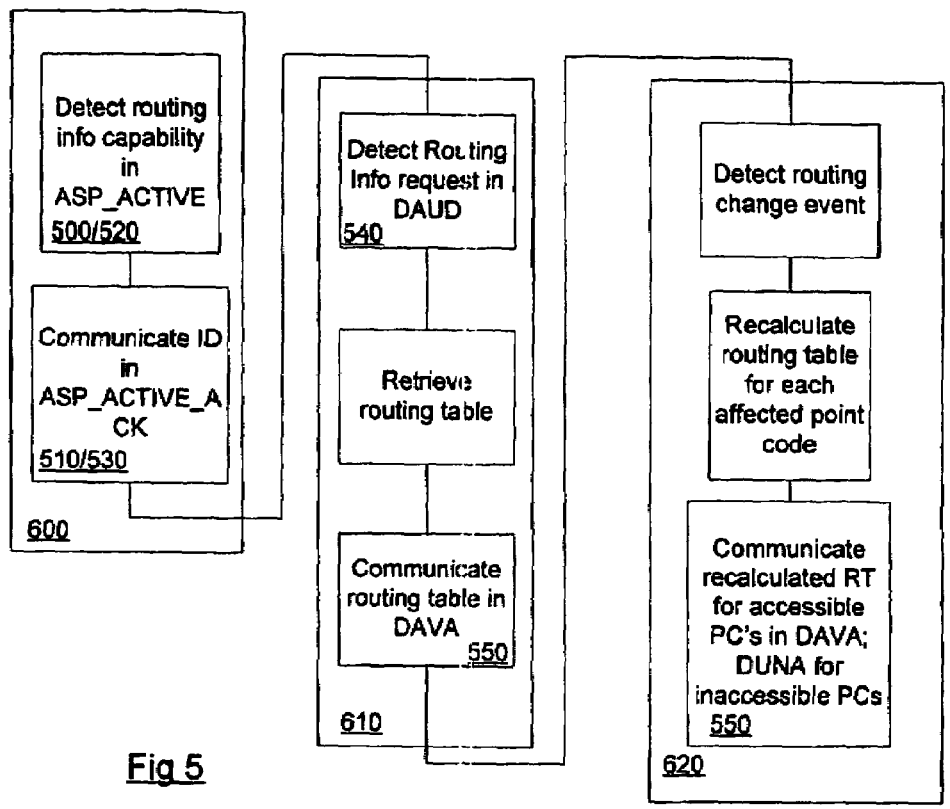
FIG. 5 illustrates the main processes that carried out by signalling gateway processes in order to implement this invention.

An exemplary sequence of events and signalling network management message exchanges is shown in FIG. 4 and the main processes used in signalling gateway 100 are illustrated in FIG. 5.

Initially the ASP signals in conventional planner to the SGP1 and SGP2 that it is up using respective ASP_UP messages which are acknowledged by ASP_UP_ACK messages as shown in FIG. 4.

The use of the RSIG protocol to pass routing information between ASP 130 and SGP1 and SGP2 will now be described in relation to steps 500 to 590 as follows.

Step 500: When the ASP is able to handle traffic it informs SGP1 by sending an ASP_ACTIVE message in which a ROUTING_INFO_CAPABILITY_REQ message is embedded. The ROUTING_INFO_CAPABILITY_REQ message is formatted as follows:

RSIG/1
RICR={ } where RSIG is the ABNF string used to identify the RSIG protocol, 1 is the version of RSIG, RICR is the ABNF string used to identify a ROUTING_INFO_CAPABILITY_REQ RSIG message.

Step 510: SGP1 replies to ASP 100 using an ASP_ACTIVE_ACK message in which is embedded an ROUTING_INFO_CAPABILITY_ACK message. SGP1 has the RSIG capability, and thus it authorizes the ASP to take advantage of this capability and it informs the ASP that its RSIG identifier is 111. The ROUTING_INFO_CAPABILITY_ACK message is formatted as follow:

```
RSIG/1
RICA = {
    RICASI = 111,
    R = 1
}
``` where RSIG is the ABNF string used to identify the RSIG protocol, 1 is the version of RSIG, RICA is the ABNF string used to identify a ROUTING_INFO_CAPABILITY_ACK RSIG message, RICASI indicates an SGP Identifier (value: 111), R indicates the result (value: 1, meaning that it is OK).

The SGP identifiers are allocated and managed by one of the SGPs which is designated a "master" SGP in any suitable way.

This registration process is illustrated by functionality 600 in FIG. 5 which is present in each SGP. In the example of FIG. 4, the registration process is then repeated for SGP2, as follows.

Step 520: ASP 100 informs SGP2 of its ability to handle traffic using a ASP_ACTIVE message in which is embedded an ROUTING_INFO_CAPABILITY_REQ message to check that SGP2 has the RSIG capability.

This second ROUTING_INFO_CAPABILITY_REQ message is formatted as follow:

```
RSIG/1
RICR = { }
```

Step 530: SGP2 replies to ASP 100 using a ASP_ACTIVE_ACK message in which is embedded an ROUTING_INFO_CAPABILITY_ACK message. It has the RSIG capability, it authorizes the ASP to take advantage of this capability and it informs the ASP that its RSIG identifier is 222.

The ROUTING_INFO_CAPABILITY_ACK message from SGP2 is formatted as follow:

```
RSIG/1
RICA = {
    RICASI = 222,
    R = 1
}
```

Next a destination query process, illustration by functionality 620 in FIG. 5 is carried out in relation to a particular destination point code selected by ASP 130. Within SG 100 each SGP maintains a routing table for each SS7 destination linking SLS values, SGP IDs and signalling link identifiers. These routing tables are updated internally to SG 100 based on information received from the SS7 network. In one embodiment for instance, whenever a TFP/TFA or TFR message is received from the SS7 network or a local signalling link changes status, each SGP forwards this information to the designated "master" SGP which can serialise the recalculation of the routing tables and their broadcast to each SGP.

Step 540: ASP 130 wants to AUDIT the SS7 remote destination 20. It sends an SIGTRAN DAUD message for this Point Code and informs SGP1 that it wants to be notified of routing changes by including a ROUTING_INFO_REQ message in the DAUD message. This information is distributed internally by the SG to all SGPs.

The ROUTING_INFO_REQ message is formatted as follow:

```
RSIG/1
RIR = {
    RIRI = ON
}
``` where RSIG is the ABNF string used to identify the RSIG protocol, 1 is the version of RSIG, RIR is the ABNF string used to identify a ROUTING_INFO_REQ RSIG message, RIRI indicates if the ASP wants to enable or disable the RSIG feature for this destination (value ON: feature is enabled).

Step 550: Immediately, SGP1 retrieves the routing table for the destination and reports the status of the SS7 remote destination 20 (as specified in the SIGTRAN procedure) and includes the routing information in the DAVA message using a first embedded ROUTING_TABLE RSIG message.

The first ROUTING_TABLE message in this example is formatted as follows (for the ITU case where the SLS has 4 bits):

```
RSIG/1
RT = {
    SIT = {
        111,
        222,
        111,
        222,
        111,
        222,
        111,
        222,
        111,
        222,
        111,
        222,
        111,
        222,
        111,
        222
    }
}
``` where RSIG is the ABNF string used to identify the RSIG protocol, 1 is the version of RSIG, RT is the ABNF string used to identify a ROUTING_TABLE RSIG message, SIT indicates an ITU Routing Table.

This first ROUTING_TABLE message indicates to ASP 130 that, to reach the remote destination 20, it is optimal for the ASP to take the decisions shown in Table 1 according to the SLS value of the MSU.

TABLE I

| SLS value | SGP |
| --- | --- |
| 0 | SGP1 (RSIG Id: 111) |
| 1 | SGP2 (RSIG Id: 222) |
| 2 | SGP1 (RSIG Id: 111) |
| 3 | SGP2 (RSIG Id: 222) |
| 4 | SGP1 (RSIG Id: 111) |
| 5 | SGP2 (RSIG Id: 222) |
| 6 | SGP1 (RSIG Id: 111) |
| 7 | SGP2 (RSIG Id: 222) |
| 8 | SGP1 (RSIG Id: 111) |
| 9 | SGP2 (RSIG Id: 222) |
| 10 | SGP1 (RSIG Id: 111) |
| 11 | SGP2 (RSIG Id: 222) |
| 12 | SGP1 (RSIG Id: 111) |
| 13 | SGP2 (RSIG Id: 222) |
| 14 | SGP1 (RSIG Id: 111) |
| 15 | SGP2 (RSIG Id: 222) |

In the following steps, various routing change scenarios will be described and, in each case, a routing change process 620 is carried out. Process 620 basically comprises 3 steps—detection the routing change, recalculation of the routing tables and communication of the updated routing tables to ASP 130 embedded in DAVA messages. As before in some embodiments each SGP may forward routing change information to the designated "master" SGP which recalculates the routing tables and broadcasts them to each SGP. Alternatively, the routing tables could be recalculated within the SGP that first detects the routing change event and broadcasted by that SGP to all the other SGPs. The DAVA messages including the updated routing tables may be sent out to ASP 130 by any of the SGPs and so any suitable and/or convenient mechanism for selecting an SGP to respond may be used, such as having the master SGP respond (if there is one), having the SGP that detects the routing change respond, or having the SGP that originally received the ROUTING_INFO_REQ message from the SGP. Of course, in some embodiments all necessary routing tables may be calculated, configured or otherwise determined in advance and stored for a set of potential routing changes.

Step 560: In this example, it is imagined that SGP1 detects for instance that signalling link 11 is no longer operational for whatever reason, and implements a routing change. ASP 130 has requested to be notified for routing changes to destination 20 only, so SGP1 informs ASP with a DAVA message containing a recalculated second ROUTING_TABLE RSIG message, formatted as follows:

```
        SIG/1
    RT = {
        SIT = {
            222,
            222,
            222,
            222,
            222,
            222,
            222,
            222,
            222,
            222,
            222,
            222,
            222,
            222,
            222
        }
    }
```

This second routing table indicates to ASP 130 that for all values of the SLS field in the MSU it is optimal for the ASP to send the MSU to SGP2 (RSIG ID 222).

Step 570: Now for the purposes of example, imagine that SGP2 receives, on the SS7 network side, a transfer prohibited (TFP) signal indicating that the first route (linkset 1) is unavailable for destination 20. The receipt of this message results in recalculated routing tables being broadcast to all SGPs and SGP1 informs ASP 130 with a DAVA message containing a third ROUTING_TABLE RSIG message, formatted as follows:
RSIG/1

```
    RT = {
        SIT = {
            111,
            222,
            111,
            222,
            111,
            222,
            111,
            222,
            111,
            222,
            111,
```

```
            222,
            111,
            222
        }
    }
```

This third ROUTING_TABLE message indicates to ASP 130 that, to reach the remote destination 20, it is once again optimal for the ASP to take the decisions shown in Table 1 according to the SLS value of the MSU.

Step 580: Now for the purposes of example, imagine that SGP1 receives, on the SS7 network side, a transfer prohibited (TFP) signal indicating that the second route (linkset 2) is unavailable for destination 20. Consequently, destination 20 is now not accessible. So SGP1 informs ASP with a DUNA message which does not contain any RSIG information since no routing table is necessary—the destination being not accessible.

Step 590: SGP1 receives, on the SS7 network side, a transfer allowed (TFA) signal indicating that the second route (linkset 2) is now available for destination 20. So SGP1 informs ASP with a DAVA message containing a fourth ROUTING_TABLE RSIG message, formatted as follows:
RSIG/1

```
    RT = {
        SIT = {
            111,
            222,
            111,
            222,
            111,
            222,
            111,
            222,
            111,
            222,
            111,
            222,
            111,
            222,
            111,
            222
        }
    }
```

This fourth ROUTING_TABLE message indicates to ASP 130 that, to reach the remote destination 20, it is once again optimal for the ASP to take the decisions shown in Table 1 according to the SLS value of the MSU.

Figure 6:
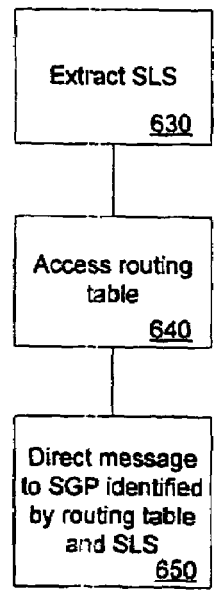
FIG. 6 illustrates steps of a process carried out by an application server process in order to send a message.

FIG. 6 illustrates the process carried out by application server process 130 in order to send a signalling message. First the SLS value is extracted from the message in step 630, then the routing table is accessed in step 640 and a SGP identifier is determined based on the SLS value and the values of the routing table. The message is then sent on the SCTP association corresponding to the SGP identifier in step 650.

It will be appreciated that the present embodiments take the form of a set of computer programs intended for use with general purpose computing and signalling platforms and which may be marketed in the form of suitable computer program products including the functionality described. It will be appreciated that the invention may equally be implemented as special purpose hardware or any combination of software and hardware.

Although a specific embodiment of the invention has been described, the invention is not to be limited to the specific arrangement so described. The invention is limited only by the claims.

The invention claimed is:

1. A method for operating a signalling gateway that performs a signalling gateway process, the method comprising the steps of:
   determining, by the signalling gateway process executed by a computer, routing information that is to be provided to an application server process performed by an application server, to identify a signalling gateway process to which to direct signalling messages destined for a particular point code on a network;
   making the routing information available to the application server process; and
   based on the routing information received, directing, by the application server process executed by a computer, the signalling messages for the particular point code based on the information, and the routing information takes the form of a routing table that serves to distribute signalling gateway process identifiers over signalling link selector values included in signalling messages sent by the application server process performed by the application server.

2. A computer readable medium as claimed in claim 1, further causing the one or more computers to perform the step of:
   responding to a change in the status of links upon a route to a particular point code by redetermining the routing information for that point code and making the redetermined information available to an application server process.

3. A computer readable medium as claimed in claim 1, wherein the determined routing information is made available to the application server process in response to receipt of an audit message sent from the application server process to the signalling gateway process for a particular destination point code.

4. A computer readable medium as claimed in claim 2, wherein the determined and/or redetermined routing information is included in a message transmitted from the signalling gateway process to the application server process that serves to indicate the availability of the point code concerned.

5. A computer readable medium as claimed in claim 1, including a registration step comprising transmitting a signalling gateway process identifier to the application server process.

6. A computer readable medium as claimed in claim 5, wherein the signalling gateway process identifier is included in an acknowledgement by the signalling gateway process of a message indicating that the application server process is ready to receive signalling traffic.

7. A method for operating an application server that performs an application server process to sending signalling messages to a signalling network via a signalling gateway comprising a plurality of signalling gateway processes, the method comprising the steps of:
   receiving, by the signalling gateway process executed by a computer, routing information and signalling link selector (SLS) values contained in signalling messages;
   identifying, by the application server process executed by a computer, a particular signalling gateway process to which to direct signalling messages destined for the particular point code by reference to the routing information received from the signalling gateway process and the SLS values contained in the signalling messages; and
   directing, by the application server process executed by a computer, the signalling messages for the particular destination point code based on routing information and the SLS values, and the routing information takes the form of a routing table that serves to distribute signalling gateway process identifiers over signalling link selector values included in the signalling messages.

8. A computer readable medium as claimed in claim 7, further causing the one or more computers to perform the step of:
   repeatedly receiving the routing information from the signalling gateway process in messages that serve to indicate the availability of the point code concerned.

9. A computer readable medium as claimed claim 7, further causing the one or more computers to perform the step of:
   initiating the repeated sending of the routing information by including a request in an audit message for a particular destination point code sent to the signalling gateway process from the application server process.

10. A computer readable medium as claimed in claim 7, further causing the one or more computers to perform the step of:
    a registration step requesting and receiving a signalling gateway process identifier from the signalling gateway process.

11. A computer readable medium as claimed in claim 10, wherein the registration request is included in a message indicating that the application server process is ready to receive signalling traffic.

12. A computer readable medium as claimed in claim 1, wherein the signalling gateway has a redundant set of signalling links to a signalling network and having a single point code, or set of point codes, therein, and comprising wherein the signalling network includes a plurality of signalling elements, with each signalling element comprising a signalling unit to which a subset of the signalling links are connected.

13. A computer readable medium as claimed in claim 1, further comprising:
    modifying, as a first modified routing table, the routing table by a first of a plurality of signalling gateway processes based on a first routing or prohibition message received by the first of the plurality of signalling gate processes;
    outputting the first modified routing table to the application server process and to all others of the plurality of signalling gateway processes;
    modifying, as a second modified routing table, the first modified routing table by a second of the plurality of signalling gateway processes based on a second routing or prohibition message received by the second of the plurality of signalling gate processes; and
    outputting the second modified routing table to the application server process and to all others of the plurality of signalling gateway processes.

14. A computer readable medium as claimed in claim 7, further comprising:
    modifying, as a first modified routing table, the routing table by a first of a plurality of signalling gateway processes based on a first routing or prohibition message received by the first of the plurality of signalling gate processes;
    outputting the first modified routing table to the application server process and to all others of the plurality of signalling gateway processes;

modifying, as a second modified routing table, the first modified routing table by a second of the plurality of signalling gateway processes based on a second routing or prohibition message received by the second of the plurality of signalling gate processes; and outputting the second modified routing table to the application server process and to all others of the plurality of signalling gateway processes.

* * * * *